(12) United States Patent
Iwata

(10) Patent No.: US 9,594,891 B2
(45) Date of Patent: Mar. 14, 2017

(54) PERSONAL AUTHENTICATION METHOD AND PERSONAL AUTHENTICATION DEVICE

(75) Inventor: Eizaburo Iwata, Tokyo (JP)

(73) Assignee: Universal Robot Kabushiki Kaisha, Tokyo (JP)

(*) Notice: Subject to any disclaimer, the term of this patent is extended or adjusted under 35 U.S.C. 154(b) by 27 days.

(21) Appl. No.: 14/383,509

(22) PCT Filed: Aug. 27, 2012

(86) PCT No.: PCT/JP2012/071546
§ 371 (c)(1),
(2), (4) Date: Sep. 5, 2014

(87) PCT Pub. No.: WO2013/136553
PCT Pub. Date: Sep. 19, 2013

(65) Prior Publication Data
US 2015/0020181 A1    Jan. 15, 2015

(30) Foreign Application Priority Data
Mar. 16, 2012    (JP) ................... 2012-059641

(51) Int. Cl.
*G06F 21/00* (2013.01)
*G06F 21/32* (2013.01)
(Continued)

(52) U.S. Cl.
CPC ......... *G06F 21/32* (2013.01); *G06K 9/00006* (2013.01); *G06K 9/00013* (2013.01);
(Continued)

(58) Field of Classification Search
CPC ...................................................... G06F 21/32
See application file for complete search history.

(56) References Cited

U.S. PATENT DOCUMENTS 6,485,981 B1* 11/2002 Fernandez ................... 436/71
6,587,711 B1* 7/2003 Alfano et al. ............... 600/476
(Continued)

FOREIGN PATENT DOCUMENTS

CN    101083274 A    12/2007
JP    2005-168627 A    6/2005
(Continued)

OTHER PUBLICATIONS

International Search Report mailed Oct. 23, 2012, issued in corresponding International Application No. PCT/JP2012/071546, filed Aug. 27, 2012, 4 pages.
(Continued)

*Primary Examiner* — Mahfuzur Rahman
(74) *Attorney, Agent, or Firm* — Seed IP Law Group LLP

(57) ABSTRACT

(Purpose) The present invention provides a technology capable of simply performing individual authentication with high accuracy by extracting the feature of the vein pattern and the feature of the palm print shape of the person to be authenticated from a single original image data photographed using a visible light image acquisition unit (e.g. visible light camera).
(Solution) An authentication light source 11 irradiates light which contains at least red light in the visible light region toward a palm of human body. An authentication image acquisition unit 12 acquires at least one reflection image to form by the light which is irradiated from the authentication light source 11, and is reflected on the palm of human body. An authentication image processing unit 13 performs image processing of the reflected image, and extracts the shape of palm print and the shape of veins in the palm respectively from a single sheet of the reflected image for the authentication to generate the authentication data.

15 Claims, 7 Drawing Sheets

(51) Int. Cl.
  *G06K 9/00* (2006.01)
  *G06K 9/46* (2006.01)
(52) U.S. Cl.
  CPC ....... *G06K 9/00885* (2013.01); *G06K 9/4652* (2013.01); *G06K 2009/00932* (2013.01)

(56) References Cited

U.S. PATENT DOCUMENTS

| | | | |
|---|---|---|---|
| 2003/0105966 A1* | 6/2003 | Pu et al. ....................... | 713/186 |
| 2004/0212739 A1* | 10/2004 | Kiuchi et al. ................ | 348/674 |
| 2005/0071635 A1* | 3/2005 | Furuyama ..................... | 713/168 |
| 2005/0089201 A1* | 4/2005 | Blancas ........................ | 382/124 |
| 2005/0180620 A1* | 8/2005 | Takiguchi ..................... | 382/128 |
| 2005/0205667 A1* | 9/2005 | Rowe ............................ | 235/382 |
| 2005/0257795 A1 | 11/2005 | Hsiu-Chen et al. | |
| 2005/0286744 A1* | 12/2005 | Yoshizu .................. | G06K 9/00 382/115 |
| 2006/0062438 A1* | 3/2006 | Rowe ............................ | 382/124 |
| 2006/0104492 A1* | 5/2006 | Maase et al. ................. | 382/124 |
| 2006/0204048 A1* | 9/2006 | Morrison et al. ............. | 382/115 |
| 2007/0016795 A1* | 1/2007 | Asano ........................... | 713/182 |
| 2007/0189583 A1* | 8/2007 | Shimada et al. ............. | 382/118 |
| 2008/0187184 A1* | 8/2008 | Yen ............................... | 382/118 |
| 2009/0087101 A1* | 4/2009 | Matsushita et al. .......... | 382/190 |
| 2010/0026453 A1* | 2/2010 | Yamamoto et al. ......... | 340/5.83 |
| 2010/0208989 A1* | 8/2010 | Narroschke et al. ......... | 382/166 |
| 2013/0124416 A1* | 5/2013 | Pawar et al. .................. | 705/44 |

FOREIGN PATENT DOCUMENTS

| | | |
|---|---|---|
| JP | 2006-120026 A | 5/2006 |
| JP | 2007-122237 A | 5/2007 |
| JP | 2007-179434 A | 7/2007 |
| JP | 2007-323389 A | 12/2007 |
| JP | 2009-134422 A | 6/2009 |
| JP | 2009-175810 A | 8/2009 |
| JP | 2010-152706 A | 7/2010 |
| WO | 2012/014300 A1 | 2/2012 |

OTHER PUBLICATIONS

Extended European Search Report, dated Mar. 16, 2016, for corresponding European Application No. 12877165.2-1901 / 2838068, 10 pages.
Second Chinese Office Action, issued Mar. 3, 2016, for corresponding Chinese Application No. 201280071437.3, 5 pages.
Wang et al., "Person recognition by fusing palmprint and palm vein images based on "Laplacianpalm" representation," *Pattern Recognition* 41:1514-1527, 2008.
Wikipedia., "HSL and HSV," Wikipedia.com, last modified Dec. 12, 2015, retrieved from https://en.wikipedia.org/w/index.php?title=HSL_and_HSV&oldid=694879918, on Mar. 2, 2016, 16 pages.
Wikipedia, "CMYK color model," Wikipedia.com, last modified Feb. 6, 2016, retrieved from https://en.wikipedia.org/w/index.php?title=CMYK_color_model&oldid=703601181, on Mar. 2, 2016, 5 pages.
Wikipedia, "Subtractive color," Wikipedia.com, last modified Jan. 12, 2016, retrieved from https://en.wikipedia.org/w/index.php?title=Subtractive_color&oldid=699462600, on Mar. 2, 2016, 3 pages.
Zhang et al., "Online joint palmprint and palmvein verification," *Expert Systems with Applications* 38:2621-2631, 2011.
Chinese Office Action mailed Jun. 6, 2015, issued in Application No. CN 2012800714373, filed Aug. 27, 2012, 12 pages.

* cited by examiner

THE FIRST TEMPLATE
DATA WITH THE
EXTRACTED SHAPE OF
PALM PRINT

THE SECOND TEMPLATE
DATA WITH EXTRACTED
SHAPE OF VEIN

PERSONAL AUTHENTICATION METHOD AND PERSONAL AUTHENTICATION DEVICE

TECHNICAL FIELD

The present invention relates to a technology for authenticating individuals using biometric information, and in particular to a technology for extracting a plurality of biometric information items consisting of vein pattern and palm print shape from a single sheet of palm image data so as to perform individual authentication using this biometric information.

BACKGROUND ART

The feature of the shape of palm print is easy to capture, because it is information on the surface of human body. However, the individual authentication by use of the palm print is considered susceptible to imposture. On the other hand, the vein's vascular pattern, which is the information inside the human body, has the advantage of being secure against imposture. For this reason, it is widely utilized in the method for individual identification. More recently, in order to raise the accuracy of the biometric authentication, there is proposed a method for individual authentication by a plurality of biometric components (multifactor authentication) which is in combination with other biometrics authentication, based on the authentication using vein pattern.

For example, Japanese Unexamined Patent Application Publication No. 2010-152706 (hereinafter referred to as patent document 1) proposes a two-factor authentication which combines the vein pattern on the palm with the shape of the palm profile. Japanese Unexamined Patent Application Publication No. 2009-175810 (hereinafter referred to as patent document 2) discloses an authentication technique using the shape of palm veins and the shape of finger veins. Further in Japanese Unexamined Patent Application Publication No. 2006-120026 (hereinafter referred to as patent Document 3), an individual authentication device is disclosed which extracts a plurality of vein patterns from a finger or a hand in a single operation.

On the other hand, in order to acquire the vein pattern using such techniques, the subject's finger or hand is irradiated with near-infrared rays, and the image which is formed under this near-infrared rays is photographed. The near-infrared rays easily penetrate through a living-body, and has a high absorbability in the vein portion, thus enabling the acquisition of the image showing the vein pattern by a camera that can take photograph under the near-infrared rays. However, the above-mentioned technique has an inconvenience that a dedicated device is indispensable which is capable of providing the emission and photography under near-infrared rays.

For solving the above-described problems, the present inventor proposed a technology in PCT International Publication Application Publication No. WO 2012/014300, in which two visible light cameras are oppositely arranged to photograph the pattern of veins on the back of a hand and the shape of the palm print simultaneously to provide individual authentication.

PRIOR ART DOCUMENT

Patent Document

Patent Document 1: Japanese Unexamined Patent Application No. 2010-152706

Patent Document 2: Japanese Unexamined Patent Application No. 2009-175810

Patent Document 3: Japanese Unexamined Patent Application No. 2006-120026

Patent Document 4: PCT International Publication Application Publication No. WO 2012/No. 014300.

SUMMARY OF INVENTION

The Purpose of the Invention

The present invention has been achieved in consideration of the above-described points.

Hence principal objective of the present invention is to provide a technology capable of simply performing individual authentication with high accuracy by extracting the feature of the vein pattern as well as the feature of the palm print shape in the palm of the individual to be authenticated from a single original image data that has been captured using a visible light image acquisition unit (e.g., visible light camera).

(One Possible Configuration of the Invention)

The present invention can be described in terms of the following items.

(Item 1)

An authentication image acquisition device that has an authentication light source, an authentication image acquisition unit, and an authentication image processing unit; wherein said authentication light source is configured for irradiating light that includes at least red light in the visible light region, toward the palm of a human body; wherein said authentication image acquisition unit is configured for obtaining at least one reflection image to form by the light which is emitted from said authentication light source and is reflected on said palm of the human body, and wherein said authentication image processing unit is configured for performing image processing of said reflection image, and thereby extracting the shape of said the palm print and the shape of palm veins in the palm respectively from said one reflection image for authentication to perform processing for generating the authentication data.

(Item 2)

The authentication image acquisition device as described in item 1, wherein said authentication image processing unit is configured to perform said processing for extracting said palm print shape by transforming the data corresponding to said reflection image into gray scale values based on R signal, G signal, and B signal in RGB color space, and wherein said authentication image acquisition unit is configured to extract said vein shape as chrominance obtainable by transforming said data corresponding to the reflection image into HSV color space, transforming the phase of H signal and the intensity of S signal on this HSV color space, and then transforming said HSV color space into RGB color space and CMYK color space.

(Item 3)

The authentication image acquisition device as described in item 1 or 2, wherein said authentication image processing unit is configured to further perform processing for generating authentication data by performing synthesis processing of said the palm print shape and the vein shape extracted for authentication (Item 4)

The authentication image acquisition device as described in any one of items 1 to 3 wherein said authentication light source and said image acquisition unit are implemented on a single mobile terminal.

(Item 5)

The authentication image acquisition device as described in item 4,
- wherein said mobile terminal is provided with a display screen capable of externally emitting light containing red light and
- wherein said authentication light source is made up of said display screen.

(Item 6)

A template image acquisition device that has a template light source, a template image acquisition unit, a template image processing unit, and a template data storage unit,
wherein said template light source is configured to be capable of irradiating ray light containing at least red light in the visible light region toward the palm of human body,
wherein said template image acquisition unit is configured to acquire at least one reflection image to form by the light which is irradiated from the template light source and is reflected on said palm of the human body,
wherein said template image processing unit is configured for performing image processing of said reflection image, thereby extracting the palm print shape and the vein shape in the palm respectively for template from said one reflection image to perform processing to generate the template data, and wherein template data storage unit is configured for storing said template data.

(Item 7)

An individual authentication system that has the authentication image acquisition device as described in any one of items 1 to 5, the template image acquisition device as described in Item 6, and a matching unit, wherein said matching unit is configured to perform individual authentication by comparing said authentication data captured by said authentication image acquisition device with said template data stored in said template data storage unit.

(Item 8)

The individual authentication system as described in item 7 further having an authentication processing drive device, a matching result transforming device, and a matching result receiving device,
wherein said authentication processing drive device is configured to request said authentication image acquisition device to start authentication processing when the prescribed conditions have been met,
wherein said matching result transforming device is configured to receive the result of the matching conducted by said matching unit,
wherein said matching result transforming device is configured to generate a unique code to the person to be authenticated or the terminal used by the same, when the result of said matching has been satisfactory for individual authentication, and
wherein said matching result receiving device is configured to receive said code generated by said matching result transforming device.

(Item 9)

A method for individual authentication including the following steps:
(1) a step of acquiring at least one reflection image formed by light emitted from the authentication light source which emits at least red light in the visible light region, and reflected on the palm of human body,
(2) a step of extracting, the palm print shape and the vein shape in the said palm respectively from said one reflection image for authentication, by performing image processing of said one sheet of reflected image;
(3) a step of performing authentication by comparing said data for authentication with the template data previously registered.

(Item 10)

The method for individual authentication as described in item 9,
wherein said authentication data includes a first authentication data that corresponds to said shape of the palm print and a second authentication data that corresponds to said shape of the vein pattern,
wherein said authentication includes a first authentication and a second authentication to be conducted after obtaining the first authentication, and wherein said first authentication is conducted using said first authentication data and said second authentication is conducted using said second authentication data.

(Item 11)

The method for individual authentication as described in item 9,
wherein said authentication data includes a third authentication data formed by integrating the first authentication data corresponding to said shape of the palm print with the second authentication data corresponding to said palm vein shape, and
wherein said authentication is performed using said third authentication data.

(Item 12)

The method for individual authentication as described in any one of items 9 to 11 including the following steps to be performed prior to said authentication:
(a) a step of acquiring at least one reflection image to form by the light which is emitted from the template light source emitting at least red light in the visible light region, and is reflected on the palm of the human body.
(b) a step of extracting the shape of the palm print and shape of the veins in said palm respectively from said one reflection image for template as the template data, by performing image processing of said reflection image, and
(c) a step of saving said template data for succeeding authentication, wherein the template data may be synthesized data captured from the shape of the palm print and the shape of the veins.

(Item 13)

A computer program to get a computer executing the method as described in any one of items 9 to 12.

Effects of the Invention

According to the present invention, a technique is provided which is capable of extracting the features of vein pattern and of palm print in the palm of the person to be authenticated, from a single sheet of original image data photographed using visible light image acquisition unit, thus enabling easily performed individual authentication with high accuracy.

DETAILED DESCRIPTION OF THE EMBODIMENTS

An embodiment of the present invention will be explained with reference to the accompanying drawings.
(Configuration of the Authentication System According to the Present Embodiment)

First, the configuration of the authentication system in an embodiment of the present invention will be explained with reference to FIG. 1.

Figure 1:
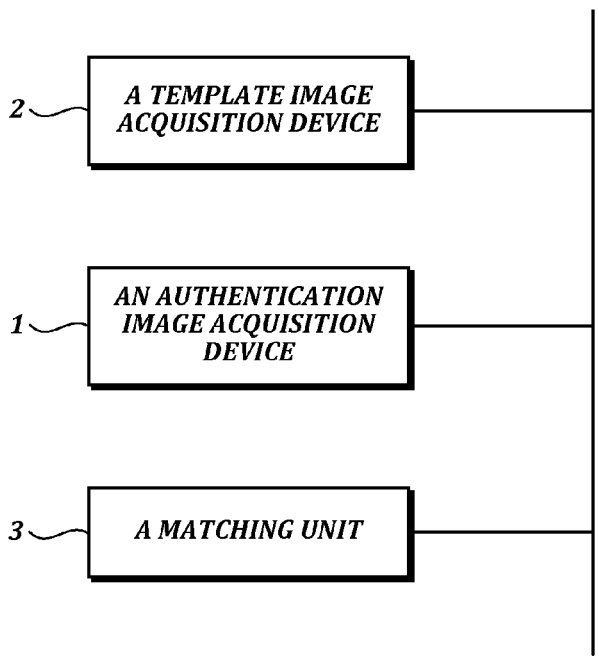
FIG. 1 is a block diagram showing the schematic configuration of the individual authentication device according to an embodiment of the present invention.

This authentication system includes an authentication image acquisition device 1, a template image acquisition device 2, and a matching unit 3 (see FIG. 1). In the present embodiment, transmission or reception of data can be carried out among the functional components through an appropriate network or communication path. The same can be said of the functional components in each of functional blocks.
(The Authentication Image Acquisition Device)

Figure 2:
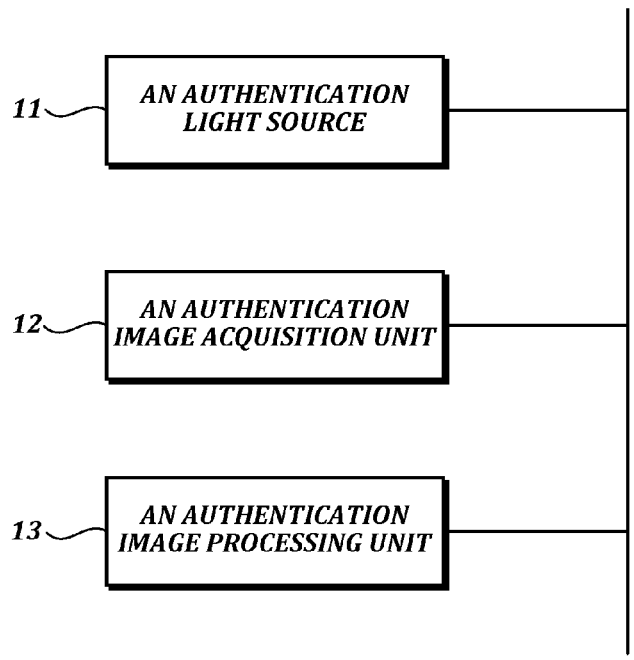
FIG. 2 is a block diagram illustrating the schematic configuration of the authentication image acquisition device.

The authentication image acquisition device 1 has an authentication light source 11, an authentication image acquisition unit 12 and an authentication image processing unit 13 (see FIG. 2).

The authentication light source 11 is configured to irradiate light which contains at least red light in the visible light region toward the palm of the human body. The authentication light source 11 may consist of an illuminant (e.g., LED) which can emit light having a wavelength in the visible light region including red light. Basically, sunlight or ambient light may be used as the light source. The accuracy of authentication, however, can be raised with artificial light as it allows for capturing correctly the wavelength range of the irradiating light. Red light as herein used means a light with a wavelength of about 580 to 750 nm (so-called reddish light). The optimal wavelength can be determined experimentally. It is thought that amber colored light (about 590 to 630 nm in wavelength) is more preferable. Although the light source may emit only the light with the wavelength range as mentioned above, it may contain the light having other wavelengths. The light source which emits a desired light by filtering may also be used. However, visible light other than red light has the possibility of producing noise when extracting the shape of the veins. Therefore, the light source which emits red light only is preferred from the viewpoint of reducing noise.

The authentication image acquisition unit 12 is configured to acquire at least one reflection image (i.e. image data) to form by the light which is emitted from the authentication light source 11, and is reflected on the palm of the human body. The authentication image acquisition unit 12 may be made up of an appropriate device such as digital camera and image scanner. Alternatively, the authentication image acquisition unit 12 may consist of a camera mounted on a mobile terminal.

The authentication image processing unit 13 is configured for performing image processing of the reflection image, thereby extracting the shape of the palm print and the shape of the veins in the palm respectively for authentication from one reflection image so as to generate the authentication data.

The authentication image processing unit 13 is configured to perform the processing to extract the shape of the said palm print, by transforming the data corresponding to the reflection image on the palm into the gray scale values which are based on R signal, G signal and B signal of RGB color space.

The authentication image processing unit 13 is further configured for extracting the shape of the veins as chrominance, by transforming the data corresponding to the reflection image of the palm into HSV color space, altering the phase of H signal and the intensity of S signal in this HSV color space, and then transforming the HSV color space into RGB color space and CMYK color space. The image processing will be described in details later.

In this embodiment, the authentication image processing unit 13 is configured to further perform the processing to generate the data for authentication, by performing synthesis processing of said shape of the palm print and said shape of vein pattern extracted for authentication.

Figure 3:
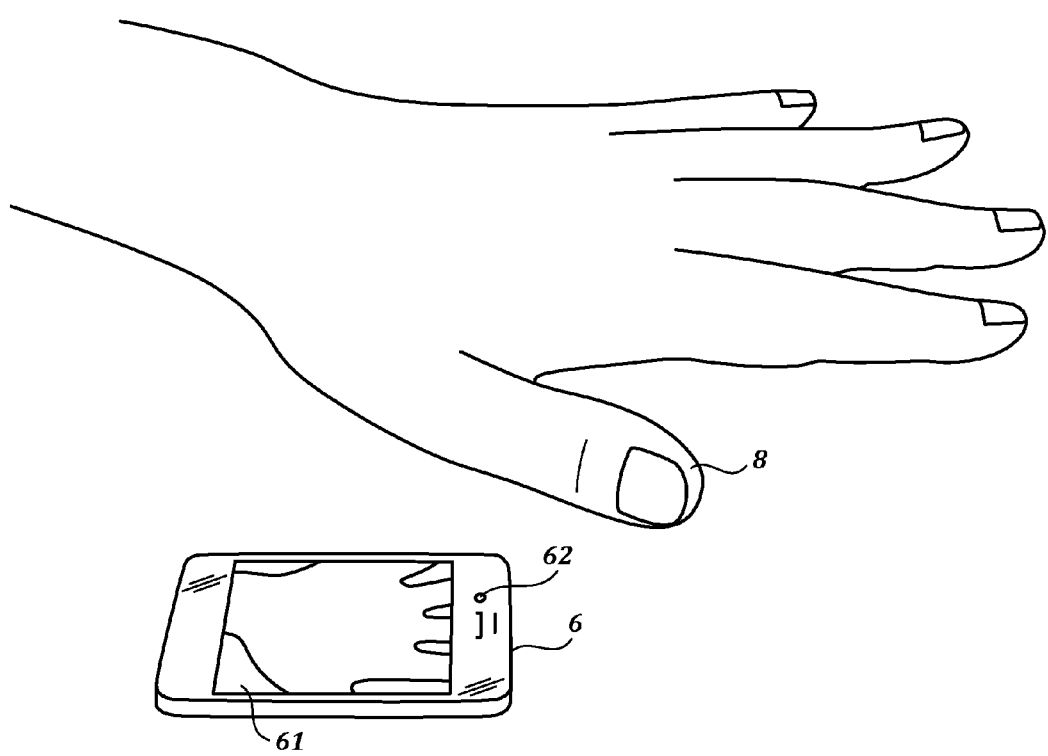
FIG. 3 is an explanatory drawing illustrating an example of using the device to acquire the original image for authentication and template.

The authentication light source 11 and the image acquisition unit 12 may be implemented together on a single mobile terminal. Such an example of implementation is shown in FIG. 3. What is called a smartphone is used here as the mobile terminal 6. The number 8 in the figure represents a human hand.

The mobile terminal 6 includes a display screen 61 which can emit light containing red light externally, and a pertaining camera 62. In the specific example shown in FIG. 3, the authentication light source is made up of the display screen 61, and the authentication image acquisition unit is made up of the camera 62. The mobile terminal 6 in FIG. 3 has a backlight (not shown) to make the display screen 61 emit light in a manner such that the display screen 61 can emit light by the transmission of the light from the backlight through the display screen 61. Generally, the display screen of a smartphone consists of liquid crystal display. Therefore, the liquid crystal panel can adjust the color of the transmitting light or the quantity of transmitting light from a backlight by controlling color filter or polarizing filter. Thus, the function as the light source in the present embodiment can be performed by controlling the liquid crystal panel and producing a light in the wavelength range suitable for the present embodiment.
(Template Image Acquisition Device)

Figure 4:
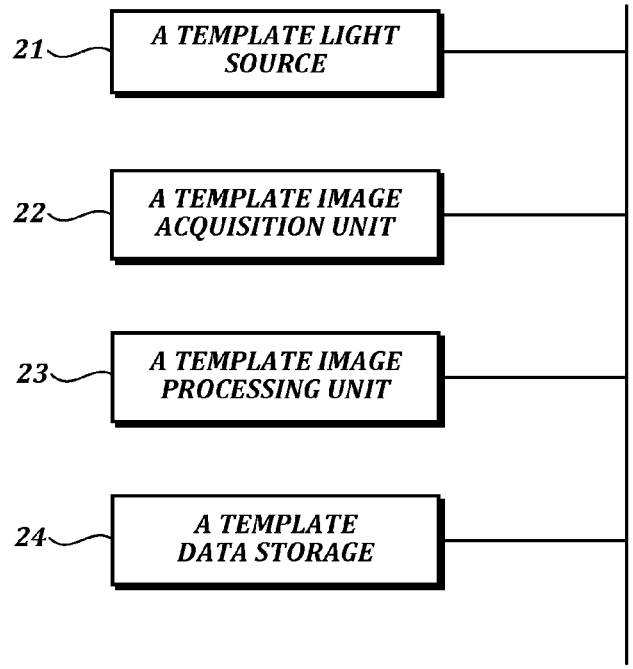
FIG. 4 is a block diagram showing the schematic configuration of the template image acquisition device.

The template image acquisition device 2 has a template light source 21, a template image acquisition unit 22, a template image processing unit 23, and a template data storage 24 (see FIG. 4).

The template light source 21 is configured to irradiate the light which contains at least red light in the visible light region toward palm of the human body. The template light source 21 may be formed in a manner similar to said authentication light source 11. Further, it is also possible to use one light source for both applications.

The template image acquisition unit 22 is configured to obtain at least one reflection image constituting of the light which is emitted from the template light source 21 and reflected on the palm of a human body. The template image acquisition unit 22 can be made up in a manner similar to said authentication image acquisition unit 12. Further a single image acquisition unit (e.g., camera) can be used for both applications.

The template image processing unit 23 is configured for performing image processing of the reflection image, and thereby extracting the shape of the palm print and the vein shape in the palm respectively for template from one reflection image to perform the processing for generating template data. Since the mechanism of the template image processing unit 23 can be similar to that of said authentication image processing unit 13, these two units can be implemented on an identical computer or a computer program.

The template data storage unit 24 is configured to store the template data. The template data storage unit 24 may be made up of e.g., a computer memory. Furthermore, the template data storage unit 24 can be made up of a suitable device that can record digital data, for instance, such as hard disk, optical disc, magneto-optical disc, and semiconductor memory.

The matching unit 3 is configured to perform individual authentication by comparing the authentication data obtained by the authentication image acquisition device 1 with the template data stored in the template data storage unit 24. Specific aspects of the authentication processing will be described in details later.

(Procedure for Individual Authentication)

The individual authentication method using said individual authentication system is explained with reference to the FIGS. 5 to 8.

(Overall Procedures)

Figure 5:
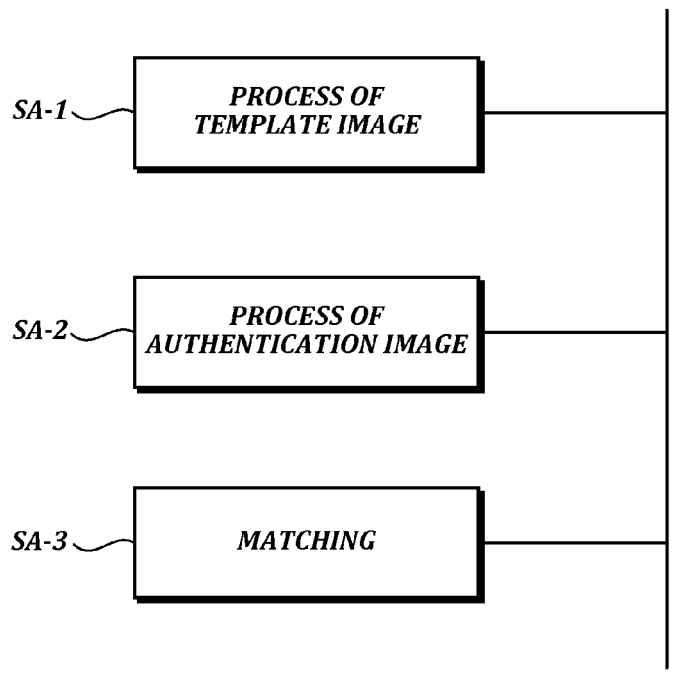
FIG. 5 is a flowchart showing the schematic flow of the individual authentication method according to an embodiment of the present invention.

The overall flow of the individual authentication in the present embodiment is illustrated in FIG. 5.

(SA-1 in FIG. 5)

First, the template image is acquired by photographing the user's palm and template data is generated by using this template image.

(SA-2 in FIG. 5)

Next, at the time of the authentication, the authentication image is acquired by photographing a user's palm. Then, the authentication data is generated by using this authentication image.

(SA-3 in FIG. 5)

Next, individual authentication is performed by comparing template data with for authentication data using the degree of similarity between them.

In the following, each of the processing items mentioned above will be explained in details:

(Processing of Template Image)

Figure 6:
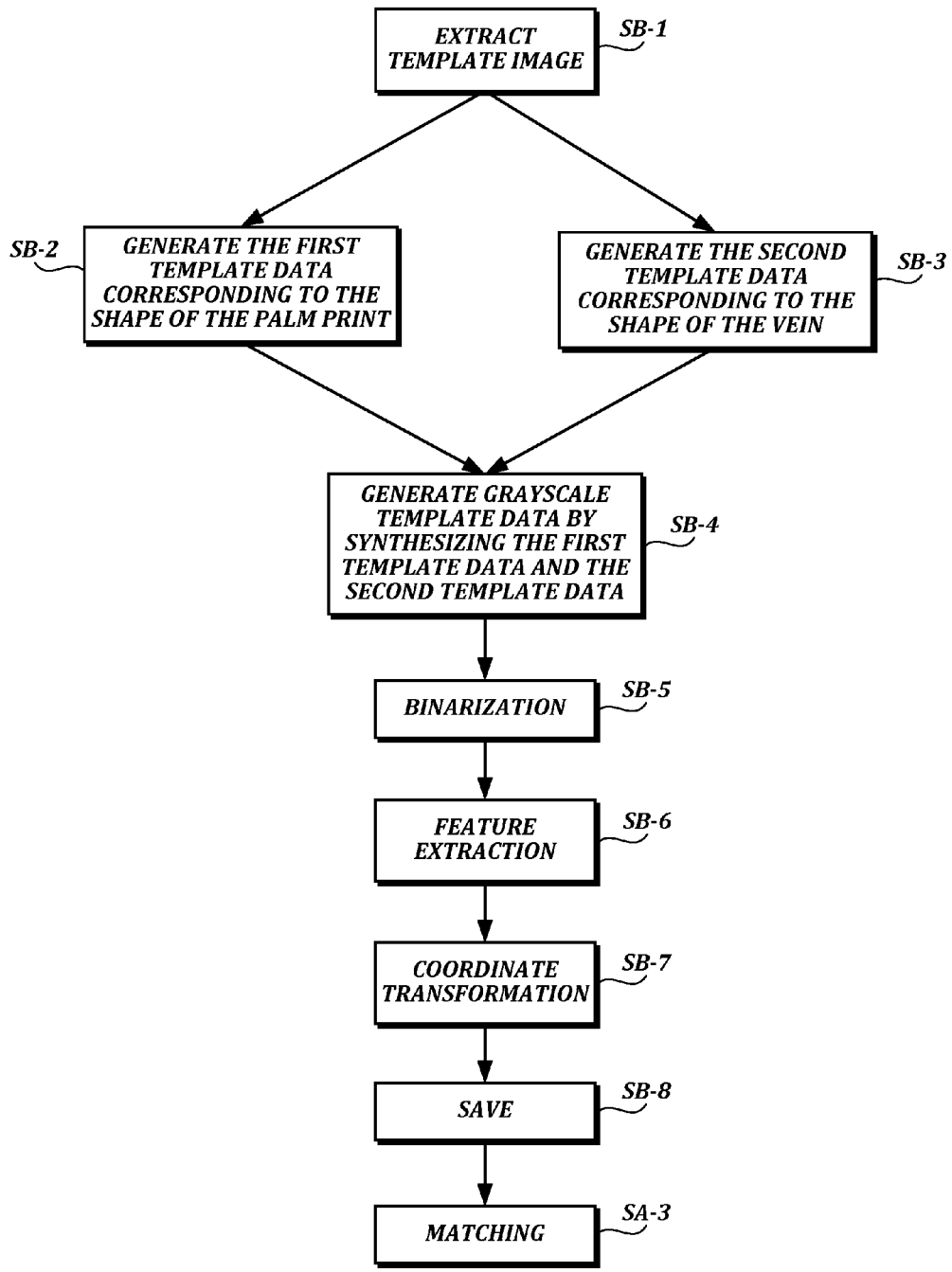
FIG. 6 is a flowchart explaining the procedure to process the image for template.

(Step SB-1 in FIG. 6)

Processing of the image for template is performed prior to the authentication processing by the following steps. Firstly, the palm of a human body is irradiated with the light which contains at least red light in the visible light region from the template light sources 21. And at least one reflection image to form by the light reflected on the palm of the human body is acquired by the template image acquisition unit 22. The color space of the image acquired in a hardware-like manner by the template image acquisition unit 22 may not necessarily be RGB. Rather, many of conventional devices (e.g., camera) captures the data in YUV color space in hardware-like manner. In this case, for example, the data in YUV color space can be transformed in a software-like manner to generate the data of RGB color space which can be used for the succeeding calculation. It goes without saying that the template image acquisition unit 22 may be configured for obtaining the data in the RGB color space in a hardware-like manner. It is to be noted that RGB color space and YUV color space are in complementary color relations. So they are transformable to one another.

(Step SB-2 in FIG. 6)

Figure 7A:
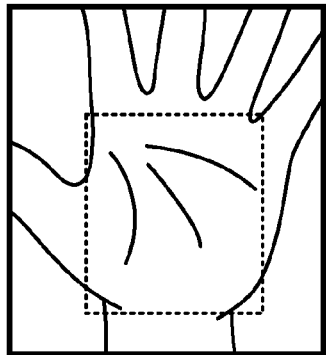
FIGS. 7A-7F are drawings explaining the example of the images obtained with the processing of the images for template and authentication.

Next, the template image processing unit 23 performs image processing of the reflection image to extract the shape of the palm print in said palm from said one reflection image for template as a first template data (see FIG. 7A). The first template data may be the shape data of the palm print portion only as shown in FIG. 7B, by abstracting the shape of FIG. 7A.

The template image processing unit 23 generates, e.g., a bit map image by converting the data in the RGB color space acquired by the template image acquisition unit 22, and further converts it into the gray scale image for extracting the feature of palm print shape. The palm print is the pattern formed by fine irregularities on a palm, thus presenting the characteristic shape which varies among different individuals.

An existing technology can be used to extract the shape of the palm print. For example, the edge-detected image showing palm print can be generated from the original image by applying gray scale conversion and Laplacian filter to the original image.

In the embodiment, the red light in the visible light range is applied onto the palm for extracting the vein pattern described below. Accordingly, the color features of an image is considered to be homogenized. Thus, it is expected that the reflection image obtained by the present embodiment could give a color feature which is similar among the pixels. In order to obtain the shape feature of the palm print, the palm lines in particular, from such reflection image, it is preferable in the present embodiment to generate the first template data in which the shape of the palm print, palm lines in particular, is emphasized, by conducting low pass filter processing of the original image, subjecting such processed image to edge emphasis with gabor filter for generating grey scale image, and after that performing erosion processing of the grey scale image generated in this way. Low pass filters, gabor filters, and erosion technique is well known and will not be described in detail.

(SB-3 in FIG. 6)

Figure 7C:
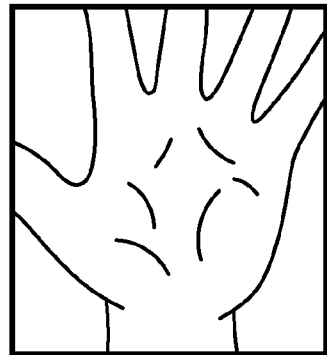
Figure 7B:
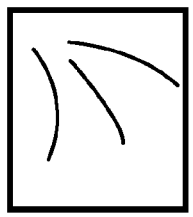
Figure 7D:
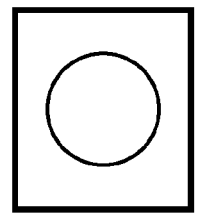

During, before or after this process, the template image processing unit 23 performs image processes of the reflection image to extract the shape of the veins in said palm from said one reflection image data for template as a second template data (see FIG. 7C). The first template data may consist of data of the vein portion only as shown in FIG. 7D by abstracting the shape of FIG. 7C. The extraction processing of the shape of the veins is explained in detail below.

The original image acquired by the template image acquisition unit 22 represents the shape of the palm print which provides the information on skin surface intensively, and the information on the shape of the veins under the skin is captured as relatively weak data. This is because the light in the visible light region was used as a light source. In order to extract the shape of the veins from such original image, it is necessary to find out the data information in which the shape of veins appears intensively, and remove the data information in which vein information does not appear easily. In the image obtained by irradiating a palm under the red light, the M (magenta) signal in CMYK color space expresses vein pattern most intensively according to present inventor's knowledge. Further, in G signal of RGB color space, the vein pattern do not appear, and the shape of palm print is expressed.

The second template data is generated by adding R signal in RGB color space which appears easily on both of the vein shape and the shape of the palm print in addition to these two chrominance signals, and performing the processing explained below.

Firstly, RGB value of each pixel on the original image is converted to HSV, and mapped on hue circle. Then, R, G, and B signal values which have been mapped on the hue circle (that is, the phase of hue H in HSV space) are shifted by the value set up suitably. Further, the intensity (size) of the chroma (saturation) in HSV space (value of S) is altered to the value which is set up suitably. The quantity of alteration can be determined experimentally.

In order to convert the image data in the above-described RGB color space to HSV color space, the following formulas can commonly be used:

$H=60*(G-B)/(MAX[R,G,B]-MIN[R,G,B])$ if $R=MAX[R,G,B]$ $H=60*(B-R)/(MAX[R,G,B]-MIN[R,G,B])+120$ if $G=MAX[R,G,B]$ $H=60*(R-G)/(MAX[R,G,B]-MIN[R,G,B])+240$ if $B=MAX[R,G,B]$ $S=MAX[R,G,B]-MIN[R,G,B]$ $V=MAX[R,G,B]$

In the present embodiment, R signal and G signal in RGB color space are transformed into R' signal and G' signal which are generated by attenuating chroma (value of 5) by 30% in negative direction on HSV space. Further, M (magenta) signal on CMYK color space is transformed into M' signal generated by shifting the phase of H+15 degrees on HSV space, and attenuating the value of S 30% in negative direction. The width of shifting this hue (that is, width of transformation) and the value of altering chroma are determined by experiment.

With the foregoing processing, the data on R' signal, G' signal and M' signal spaces that are different from the data in the original RGB space and CMYK space are obtained. In the present embodiment, the data on R', G' and M' spaces obtained in this way can be expressed as gray scale image in 8 bit (256 levels) respectively.

$GPvein=(\alpha_1*R'+\alpha_2*M'-\alpha_3*G')$ wherein:
G Pvein: Gray-scale data obtained from R' signal, G' signal and M' signal values
R': The value obtained by transforming the value of R signal in the above-described RGB color space into HSV color system, altering the chroma (−30%), and bringing it back to the RGB color system
G': The value obtained by transforming the value of the G signal in the above-described RGB color space into HSV color system, altering the chroma (−30%), and bringing it back to RGB color system
M': The value obtained by transforming the value of magenta signal in the above-described CMYK color space into HSV color system, altering the hue (+15 degrees), the chroma (−30%), and bringing it back to CMYK color system
α: Coefficient (determined experimentally)

For example, the optimal coefficient value as an experimental value is $GPvein=(0.6*R'+0.6*M'-0.2*G')$.

The calculation of said GPvein is performed for each pixel. If the calculation for each pixel gives zero or less, the value of GPvein is set to zero. If the calculation for each pixel results in 255 or more, the value of GPvein is set to 255. In this way, the second template data can be generated as a gray scale image in which the vein pattern is emphasized.

In the forgoing explanation, the examples was described in which the R signal and the G signal in RGB color space and the magenta signal in CMYK color space were used. However, B signal in RGB color space, cyan signal and yellow signal in CMYK color space can be used additionally.

Further, while RGB color space and CMYK color space are used directly in the forgoing explanation, color space transformable for RGB color space (e.g., YCbCr, YIQ, Luv, Lab, XYZ) may be used instead of RGB color space to extract the features of the data in the template image or in the authentication image. That is, the data in RGB space and the data in the color space transformable therewith can be transformed by the prescribed formula. Therefore, the forgoing explanation can apply to the case in which other data than RGB color space is used through the mediation of the prescribed data transformation. Therefore, it embodies the principles of the present invention and is included within its spirit and scope to express the feature of the image using the data obtainable by mapping this data to other color spaces instead of the data showing the feature in RGB space according to the present invention, or to perform the authentication using the feature amount expressed in this way.

As for each of the coefficients in the forgoing description, the optimal value can be determined experimentally. There may be a case where the coefficient is a negative value. In addition, the above-described coefficient α is generally experimentally determined in the environment of the external light source (e.g., brightness).

(Step SB-4 in FIG. 6)

Figure 7E:
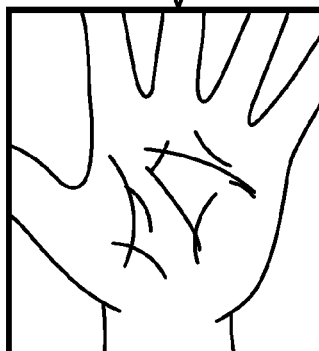
Figure 7F:
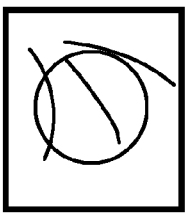

The template image processing unit 23 performs synthesis processing of the first template data and the second template data to generate the template data (the third template data) in gray scale (see FIG. 7E). Likewise, the synthesized template data may consist of abstracted data as shown in FIG. 7F.

Specifically, synthesis processing of the first template data GPpalm in which the features of the shape of the palm print appears, and the second template data GPvein in which the features of the vein pattern appears can be performed as follows:

Assuming that both of said GPpalm and GPvein are in the gray scale image of 8-bit, 256 levels, the template data will be generated as follows:

Template data $(GP)=0.5GPpalm+0.5GPvein$
(wherein the value of 255 or more is processed as 255)

Although the coefficient 0.5 in this formula means the case where the synthesis processing is performed on the first template data and the second template data in equal proportion, weighting value may be given to either one of them.

(Step SB-5 in FIG. 6)

Next, the template image processing unit 23 binarizes the template data in gray scale.

Since binarization of the template data (TD) can be performed with a popular technique, such as moving average in each pixel or each block, it will not be described in detail here.

(Step SB-6 in FIG. 6)

Next, the template image processing unit 23 performs feature extraction for the template data. For example, the Hough transformation is known as the method for extracting the features, In that method, voting procedure is carried out on the candidate objects for extracting the straight line feature to represent the feature of the image concerned in accordance with the voting results. The feature extraction by the Hough transformation is also known and will not be described in detail.

(Step SB-7 in FIG. 6)

Next, the template image processing unit 23 performs coordinate transformation on the data extracted for the feature (e.g., straight line).

Since the straight line group extracted as the feature is represented, e.g., as $\rho=X*\cos\theta+Y*\sin\theta$, it can be expressed as point group in $(\rho,\theta)$ space. The Fourier transformation of this $(\rho,\theta)$ space data is carried out, and is followed by the coordinate transformation $\rho\rightarrow\log(\rho)$ for post-processing. In this coordinate transformation, a difference is taken as $\log(\rho i)-\log(\rho i-1)$ to facilitate the succeeding processing.

Such coordinate transformation is also well known, and will not be described in detail. In the embodiment, the data obtained by coordinate transformation (including differential calculation) gives the data representing the feature of the template image.

(Step SB-8 o in FIG. 6)

Then, the template image processing unit 23 saves the template data on which the above-described processing was applied in the template data storage unit 24 for succeeding authentication. The above-described processing is usually performed before matching processing which will be described below.

(Processing of the Authentication Image)

Processing of the authentication image is explained below:

Basically, processing of authentication image can be performed in a similar manner like the processing of the template image.

Figure 8:
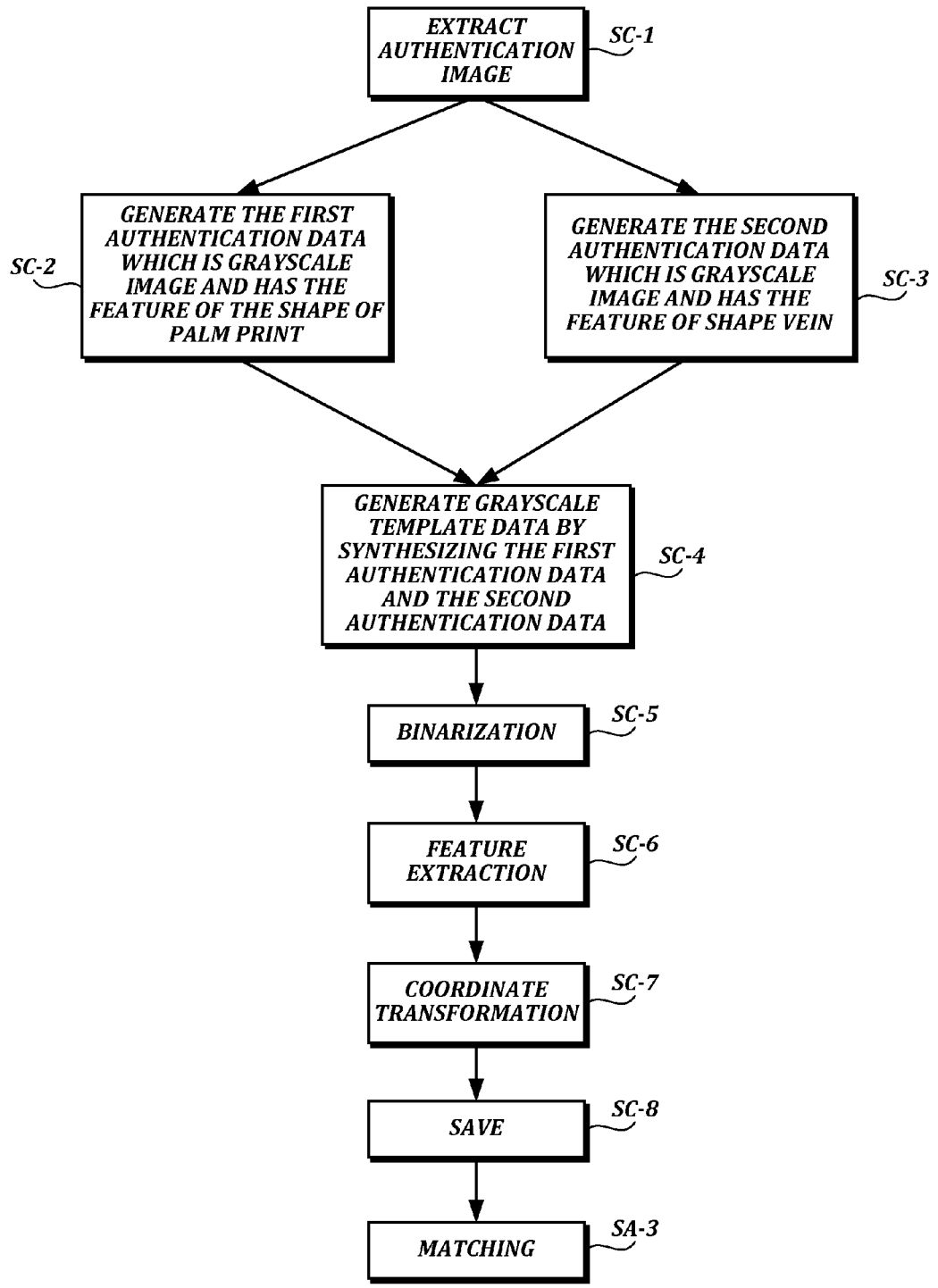
FIG. 8 is a flowchart explaining the procedure to process the image for authentication.

(Step SC-1 in FIG. 8)

Firstly, the palm of a human body is irradiated with the light which contains at least the red light in the visible light region from the authentication light source 11. And at least one reflection image to form by the light reflected on the palm of the human body is acquired by the authentication image acquisition unit 12.

(Step SC-2 in FIG. 8)

Next, the authentication image processing unit 13 extracts said shape of the palm print in the palm for authentication from said reflection image as a first authentication data (see FIG. 7A) by performing image processing of the reflected image data. The first authentication data may consist of the shape data of palm print portion only as shown in FIG. 7B obtainable by abstracting the shape of FIG. 7A. Whether or not the abstraction is made is determined during the processing to generate the template data.

(Step SC-3 in FIG. 8)

During, before or after this step, the authentication image processing unit 13 carries out image processing of the reflected image and thereby extracts the vein shape in the said palm for authentication as the data for the second authentication (see FIG. 7C). The data for the first authentication may be the data of vein portion only as shown in FIG. 7D by abstracting the shape of FIG. 7C.

(Step SC-4 in FIG. 8)

The authentication image processing unit 13 performs synthesis processing of the first authentication data and the second authentication data to generate the data for authentication as gray scale (see FIG. 7 (e)). The data in abstract manner as shown in FIG. 7 (f) may be used as the synthesized authentication data (a third authentication data).

(Step SC-5 of FIG. 8)

Next, the authentication image processing unit 13 binarizes the gray scale data for authentication.

(Step SC-6 in FIG. 8)

Next, the authentication image processing unit 13 performs feature extraction of the data for authentication.

(Step SC-7 in FIG. 8)

Next, the authentication image processing unit 13 performs coordinate transformation of the extracted feature data.

(Step SC-8 in FIG. 8)

Next, the data for authentication which has been subjected to the above-described processing is temporarily saved in an authentication data storage unit (not shown) for the use of the succeeding authentication.

(Matching Processing)

After the above process, as shown in step SA-3 in FIG. 5, individual authentication is performed by the matching unit 3, by comparing template data with the authentication data using the degree of similarity. In an example of the authentication using the degree of similarity, the phase-only correlation is calculated from the data generated by the above-described steps SB-7 and SC-7 (the data subjected to the coordinate transformation). Then, the rotation angle ($\theta$) and magnification ($\rho$) of the authentication image relative to the template image can be calculated. In the embodiment, the values acquired from the maximum value of the phase-only correlation in space ($\rho$, $\theta$) or the values obtained from its periphery can be adopted as the threshold value to achieve the individual identification. The phase-only correlation method itself is well known, and will not be described in detail. Other techniques than the phase-only correlation may also be used as well.

According to the embodiment, the feature of the vein pattern and the feature of the shape of the palm print in the palm of the person to be authenticated are extracted from a single original image data photographed using the visible light image acquisition unit (e.g., visible light camera), thus providing an easy and simple individual authentication with high accuracy which enables simplification of devices, weight reduction, and cost reduction.

In this embodiment, the palm print extraction and vein pattern extraction can be performed using a single light source (which emits red light), thus permitting simplification of devices, weight reduction, and cost reduction. It is to be noted, however, that the present invention may be executed using two or more light sources as well.

(First Modification)

In the above-described embodiment, synthesis processing was performed on the data showing the shape of palm print and the data showing vein pattern to generate the data for templates and the data for authentication. However, such synthesis process can be omitted when performing a two-step authentication.

That is, the template image acquisition device prepares the first templates data corresponding to the shape of palm print, and the second template data corresponding to vein pattern as the template data. On the other hand, the authentication image acquisition device captures the first authentication data corresponding to shape of the palm print, and the second authentication data corresponding to vein pattern as the authentication data. Then, the matching unit performs the first authentication by comparing the first authentication data with the first template data. The second authentication is performed by comparing the second authentication data with the second template data only after the first authentication has passed. The process of dividing the authentication into two stages enables the reduction of frequency the vein information is sent to the matching unit, thus mitigating the load on a communication path or the matching unit.

In the above-described embodiment, the first template data and the second template data were made to be gray scale image, and then synthesis processing of this first template data and the second template data is performed to generate the template data GP in the gray scale image before binarization with the step SB-5. However, it can also be arranged in a manner such that the process up to the binarization can be performed in the stage in which generation processes of the first and second template data are performed, and the binarized first and second template data are processed for synthesis to generate an integrated template data. The same can be said of the data for authentication.

(Second Modification)

In the processing of Step SB-3 of the above-described embodiment, R signal and G signal in RGB space were transformed into R' signal and G' signal by attenuating the chroma (the value of S) on HSV space, while M (magenta) signal on CMYK color space is transformed into M' signal by shifting the phase of H on HSV space, and attenuating the value of S. In the second modification, the following processing is performed instead of the processing described above.

R signal, G signal and B signal in RGB color space are transformed into R' signal, G' signal and B' signal in RGB color system by multiplying the chroma (value of S) in the range of H=0 to 60 degrees on HSV space by 0.1, and shifting the hue (H)+115 degrees as a whole. While M (magenta) signal on CMYK color space is transformed into M' signals in CMYK color system generated by attenuating the value of chroma by 30% in the negative direction in HSV space. The width of shifting in this hue (that is, width of transformation) and the value of transformation of chroma are determined experimentally.

In consequence of the above-described processing, the data of R' signal, G' signal, B' signal and M' signal spaces, which are different from the data of the original RGB space and CMYK space, can be obtained. In the second modification, the R', G', B', M' signal space data can be represented as gray scale image GPvein of 8 bit (256 levels) respectively.

$$GPvein=(\alpha_1*R'+\alpha_2*G'-\alpha_3*B'-\alpha_4*M')$$

Wherein;
GPvein: gray scale data obtained from the values of R' signal, G' signal, B' signal, and M' signal.
R': The value obtained by transforming the value of R signal in RGB color space into HSV space, altering the chroma (S) and hue (H) and then bringing it back to RGB color system.
G': The value obtained by transforming the value of G signal in RGB color space into HSV space, altering the chroma (S) and hue (H) and then bringing it back to RGB color system.
B': The value obtained by transforming the value of B signal in RGB color space into HSV space, altering the chroma (S) and hue (H) and then bringing it back to RGB color system.
M': The value obtained by transforming the magenta signal in CMYK color space into HSV space, altering the chroma (S) and then bringing it back to CMYK color system.
α: The value of coefficient (determined experimentally)

For example, the coefficient value optimal as an experimental value is; GPvein=(0.5*R'+0.1*G'−0.05*B'−0.1*M')

The calculation of the above-described GPvein is performed for each pixel. If the calculation for each pixel results in zero or less, the value of GPvein is set to 0, and if the calculation result for each pixel becomes 255 or more, the value of GPvein is set to 255. Thus, the second template data can be generated as a gray scale image where the vein pattern is emphasized. The same processing as described above can be employed to generate the authentication data in Step SC-3.

When the authentication system of the present embodiment is implemented, e.g., on a mobile terminal like smartphone, acquisition of image for template and acquisition of the image for authentication are assumed to be done at different locations, and therefore the light source environment would vary remarkably at the times for acquisition of the two images. According to the processing in the second modification, template data or the authentication data which are robust in the light source environment can be obtained. Other configurations in the second modification are identical with those of the above-described embodiment, and will not be described here.

(Third Modification)

Figure 9:
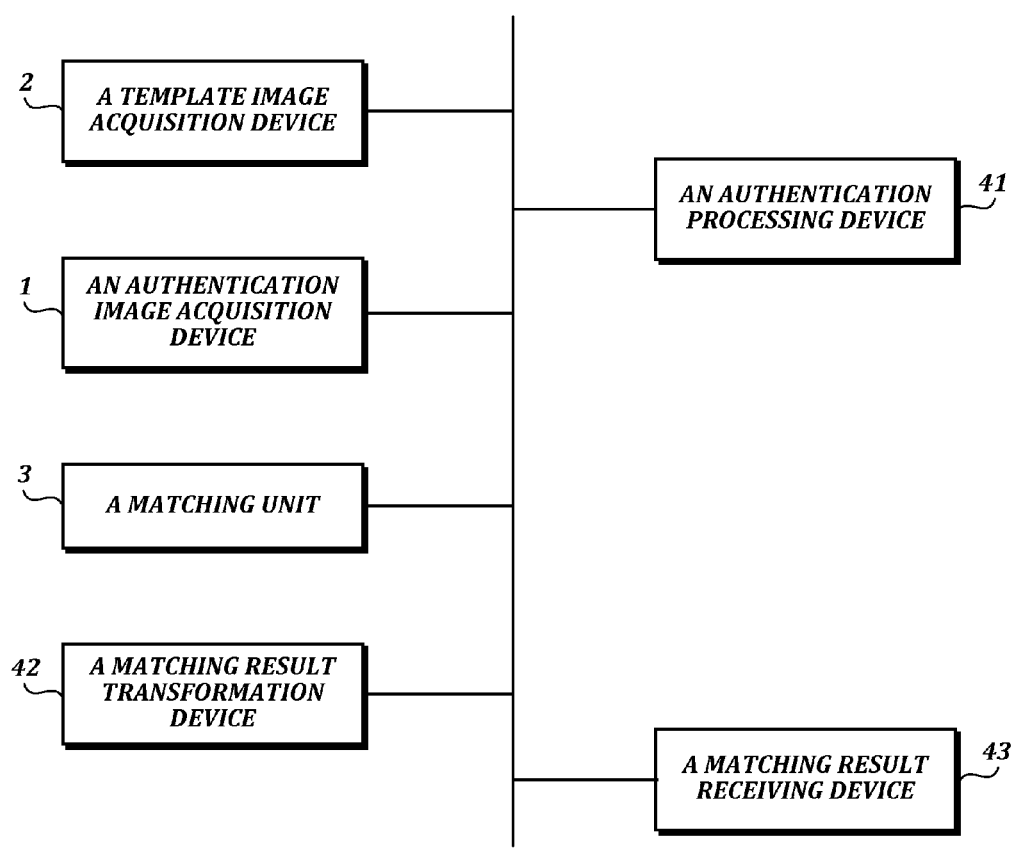
FIG. 9 is a schematic block diagram for explaining the third modification of the present invention.

In the above-described embodiment, the authentication system included an authentication image acquisition device, a template image acquisition device, and a matching unit. On the other hand, the system of the third modification further includes an authentication processing drive device 41, a matching result transformation device 42, and a matching result receiving device 43 (see FIG. 9). In the following example, the authentication image acquisition device 1, a matching unit 3, and a matching result transformation device 42 are implemented on mobile terminal such as smartphone, and then the authentication processing drive device 41 and the matching result receiving device 43 are implemented on a server, allowing for their communications via network. Needless to say, it will be appreciated that such a system configuration is exemplary and various modifications and alterations may be made to it.

The authentication processing drive device 41 is configured to request the authentication image acquisition device 1 to start processing for authentication (e.g., starting the procedures after Step SC-1 in FIG. 8), when the predetermined conditions have been met. For example, the authentication processing drive device 41 may also be configured to send to the mobile terminal a request for authentication processing by the authentication processing drive device 41, based on the positional information transmitted to the server from the mobile terminal in a case where the mobile terminal concerned has entered a prescribed zone. In an additional configuration, the mobile terminal may be provided with NFC (Near Field Communication)-enabled IC chip, and when the mobile terminal has entered a wireless local area of other NFC-enabled IC chips, the mobile terminal concerned can request the server side to start the authentication processing. Further, the authentication result of individual identification system in the embodiment may be transmitted to the server. More specifically, when a NFC-enabled credit card is held up against smartphone (which corresponds to an example of the mobile terminal), the individual verification system implemented on the smartphone starts up, and if it has verified the individual, the system can transmit the result to the charging server, thus materializing the charge of the credit card concerned. Alternatively, the authentication processing drive device 41 may be implemented on various information typed home appliances or automobile connected with the IPv6 (Internet Protocol Version 6) network instead of a server. For example, an arrangement can be made in a manner such that when a car detects that a mobile terminal has entered into the car, the authentication processing drive device 41 in a car starts the authentication processing. In this case, the authentication image acquisition device 1 or the matching unit 3 may be implemented in the car.

The matching result transformation device 42 is configured for receiving the result of matching by the matching unit 3. Furthermore, the matching result transformation device 42 is configured for generating unique code to the individual to be authenticated or the terminal used by the same, when the result of the matching shows a satisfaction for the individual verification. The transmission of the matching result by the matching unit 3 through a public network could raise concerns about the protection of personal information. Therefore, in the third modification, another unique code is generated on the basis of the matching result by the matching unit 3, and this code is transmitted to the matching result receiving device 43 through a network.

More specifically, the matching result transformation device 42 in this modification generates a unique code to the terminal used (e.g., smartphone or PC), only when the subject has been identified to be the person himself/herself as the result of matching process by the matching unit 3. The term unique code herein used means a digital certificate stored previously in the matching result transformation device 42, for example. Alternatively, an OpenID peculiar to a terminal can also be used as this code. According to this arrangement, each individual can be identified using an OpenID. An official number peculiar to each individual (e.g., national ID or citizen card ID) also may be used as a unique code.

The matching result receiving device 43 is configured for receiving the code generated by the matching result transformation device 42. The matching result receiving device 43 can demand the processing by a processing device for electronic payment (not shown), by using the matching result obtained, for example. Since other configurations in the third modification is identical with the above-described embodiment, detailed description will be omitted.

The method according to this embodiment can be carried out by a computer program which can be executed by a computer. Moreover, this program is recordable on various kinds of computer-readable media.

It should be appreciated that the scope of this invention is not particularly limited to the said embodiment and various modifications and alterations may be made to the invention without departing from the spirit and scope of the invention.

For example, each component described above may exist as a functional block, and does not need to be an independent hardware. As for the method of implementing these components, either hardware or computer software may be used. Further, one functional component according to the present invention may be embodied by a set of two or more functional components, while the plural functional components according to the present invention may be achieved by one functional component.

In addition, the functional components may be positioned away from each other physically. In such a case, the functional components may be connected with each other through a network.

So far as the representative examples of positioning for the respective functional components are concerned, it is assumed that there exist, but not limited to, the following cases. Essentially, what is important in this regard is that each of the components be suitably implemented to carry out their function required.

(1) A case where the following components are all in an identical apparatus.

Template image acquisition device 2
Authentication image acquisition device 1
Matching unit 3.

(2) A case where the template image acquisition device 2, the authentication image acquisition device 1, and the matching unit 3 are implemented on separate terminals respectively, being connected with each other through a communication path.

(3) A case where only the matching unit 3 is implemented on a device separate from the one on which the authentication image acquisition device 1, and the template image acquisition device 2 are implemented, being connected with each other through a communication path.

(4) A case where only the template image acquisition device 2 is implemented on a device separate from the one on which the authentication image acquisition device 1 and the matching unit 3 are implemented, being connected with each other through a communication path.

(5) A case where only the authentication image acquisition device 1 is implemented on a device separate from the one on which the template image acquisition device 2 and the matching unit 3 are implemented, being connected with each other through a communication path.

(6) A case where the template image acquisition device 2 is implemented not on a single device, but on a plurality of devices, for example as follows:

(6-1) The image photographed by the template image acquisition unit 22, which is implemented on a certain device, is transmitted through a communication path for processing by the template image processing unit 23 and the template data storage unit 24 which were implemented on other device.

(6-2) The data processed by the template image processing unit 23 is transmitted through a communication path to the template data storage unit 24 for storage.

(6-3) The processing at the template image processing unit 23 is conducted halfway by a device (e.g., processing items up to SB-6 in FIG. 6) and the result is transmitted through a communication path for further processing by other device. In this case, the template image processing unit 23 is made up of plural devices located at distance from each other geographically.

(6-4) The processing result in the template image processing unit 23 (for example, the data obtained by step SB-7 in FIG. 6) are decomposed into two parameters, and each of them is saved in the two template data storage units 24 disposed somewhere else through a communication path. One template data storage unit 24 may be disposed in the template image acquisition device 2. In this case, the template data storage unit of the present invention is made up of the two storages devices located at distance from each other geographically.

(7) A case where the authentication image acquisition device 1 is implemented not on a single device but on plural devices. Though the situations are basically identical with those of said template image acquisition device 2, the following cases can be considered, for example;

(7-1) The image photographed by the authentication image acquisition unit 12 of the authentication image acquisition device 1 is transmitted through a communication path, and the processing is performed by the authentication image acquisition unit 13 implemented on other device.

(7-2) The processing at the template image processing unit 13 is performed halfway on a device (e.g., processing up to SC-6 in FIG. 8), and the result transmitted through a communication path for further processing by authentication image processing unit 13. In this case, the authentication image processing unit 13 is made up of plural devices (8) A case where a palm print shape data and a veins shape data for authentication which have been obtained from one reflection image are used or stored in distributive manner on different devices as the first authentication data and the second authentication data respectively. When brought into a set, the first authentication data and the second authentication data correspond to an instance of the authentication data in the foregoing example. In addition to, or instead of this setup, there is a case where the palm print shape data and the vein shape data obtained from one reflection image for template are used or stored in distributive manner on different devices as the first template data and the second template data respectively. In terms of a set, the first template data and the second template data correspond to an instance of the template data in the above-described example. Image acquisition, image processing, or matching can also be performed in accordance with the technique of the foregoing embodiments or the modifications thereof, using various data saved separately in this manner.

EXPLANATION OF CODE NUMBER

1 Authentication image acquisition device
11 Authentication light source
12 Authentication image acquisition unit
13 Authentication image processing unit
2 Template image acquisition device
21 Template light source
22 Template image acquisition unit
23 Template image processing unit
24 Template data storage unit
3 Matching unit
6 Mobile terminal
61 Display screen
62 Camera
8 Hand of user

What is claimed is:

1. An authentication image acquisition device, comprising:
   an authentication light source,
   an authentication image acquisition unit, and
   an authentication image processing unit,
   wherein said authentication light source irradiates light that contains at least red light in the visible light region toward a palm of a human body,
   wherein said authentication image acquisition unit comprises a camera that obtains at least one single reflection color image formed by the light which is irradiated from said authentication light source and is reflected from said palm of the human body, and wherein said at least one single reflection color image has RGB (red green blue) pixel values in RGB color space or pixel values in a color space that is convertible into or from RGB color space,
   wherein said authentication image processing unit performs image processing of said single reflection color image, and thereby extracts a shape of a palm print and a vein pattern in the palm respectively from said single reflection color image for authentication to conduct processing to generate authentication data, and
   wherein said image processing in said authentication image processing unit comprises, for extracting the vein pattern, processing of signals in the single reflection color image, and wherein said image processing is executed in at least a three dimensional color space used for specifying the single reflection color image, which single reflection color image is also used for extracting the shape of the palm print, and thereby extracting the vein pattern.

2. The authentication image acquisition device as described in claim 1, wherein said authentication image processing unit performs the image processing for extracting said shape of the palm print by transforming data corresponding to said single reflection color image into a value of gray scale based on the R (red) signal, the G (green) signal, and the B (blue) signal in the RGB color space, and
   wherein said authentication image processing unit is configured to transform said data corresponding to the single reflection color image into HSV (hue saturation value) color space and then alter the phase of the H (hue) signal and the intensity of the S (saturation) signal in the HSV color space and subsequently extract said vein pattern via chrominance obtained by transforming said HSV color space into RGB color space and CMYK (cyan magenta yellow black) color space.

3. The authentication image acquisition device as described in claim 1, wherein said authentication image processing unit further performs the processing to generate said authentication data by performing synthesis processing of said extracted shape of the palm print and said extracted vein pattern for authentication.

4. The authentication image acquisition device as described in claim 1, wherein said authentication light source and said authentication image acquisition unit are both implemented on one mobile terminal.

5. The authentication image acquisition device as described in claim 4,
   wherein said mobile terminal is provided with a display screen capable of externally emitting light containing red light, and
   wherein said authentication light source is made up of said display screen.

6. The authentication image acquisition device as described in claim 1, wherein said authentication image acquisition unit uses visible light, and said single reflection color image is formed by a wavelength bandwidth in the visible light region.

7. The authentication image acquisition device as described in claim 1, wherein the processing of signals in the single reflection color image comprises a process for changing specification values of the signals representing colors in the three dimensional color space within pixels of the single reflection color image.

8. The authentication image acquisition device as described in claim 1, wherein the processing of signals in the single reflection color image comprises a process for changing specification values of the signals representing colors, thereby generating one or more images in which the vein pattern is emphasized by using the processing of signals representing colors within pixels of the single reflection color image.

9. A template image acquisition device, comprising:
   a template light source,
   a template image acquisition unit,
   a template image processing unit, and
   a template data storage unit,
   wherein said template light source irradiates light containing at least red light in the visible light region toward a palm of a human body,
   wherein said template image acquisition unit comprises a camera that acquires at least one single reflection color image formed by the light which is irradiated from the template light source and is reflected from said palm of the human body, wherein said at least one single reflection color image has RGB (red green blue) pixel values in RGB color space or pixel values in a color space that is convertible into or from RGB color space, wherein said template image processing unit performs image processing of said single reflection color image, thereby extracting a shape of a palm print and a shape of the veins in the palm, respectively, from said single reflection color image for a template so as to perform processing to generate template data, wherein said template data storage unit stores said template data, and wherein said image processing in said template image processing unit comprises, for extracting the shape of the veins, processing of signals in the single reflection color image, and wherein said image processing is executed in at least a three dimensional color space used for specifying the single reflection color image, which single reflection color image is also used for extracting the shape of the palm print, and thereby extracting the shape of the veins.

10. An individual authentication system, comprising:
an authentication image acquisition device which includes:
  an authentication light source,
  an authentication image acquisition unit, and
  an authentication image processing unit,
wherein said authentication light source irradiates light that contains at least red light in the visible light region toward a palm of a human body,
wherein said authentication image acquisition unit comprises a camera that obtains at least one single reflection color image formed by the light which is irradiated from said authentication light source and is reflected from said palm of the human body, and wherein said at least one single reflection color image has RGB (red green blue) pixel values in RGB color space or pixel values in a color space that is convertible into or from RGB color space,
wherein said authentication image processing unit performs image processing of said single reflection color image, and thereby extracts a shape of a palm print and a vein pattern in the palm respectively from said single reflection color image for authentication to conduct processing to generate authentication data, and
wherein said image processing in said authentication image processing unit comprises, for extracting the vein pattern, processing of signals in the single reflection color image, and wherein said image processing is executed in at least a three dimensional color space used for specifying the single reflection color image, which single reflection color image is also used for extracting the shape of the palm print, and thereby extracting the vein pattern, and
a template image acquisition device which includes:
  a template light source,
  a template image acquisition unit,
  a template image processing unit,
  a template data storage unit, and
  a matching unit,
wherein said template light source irradiates light containing at least red light in the visible light region toward a palm of a person, wherein said template image acquisition unit acquires at least one single reflection color image formed by the light which is irradiated from the template light source and is reflected from said palm of the person, wherein said template image processing unit performs image processing of said single reflection color image, thereby extracting a shape of a palm print and a shape of the veins in the palm, respectively, from said single reflection color image for a template so as to perform the processing to generate template data, and wherein said template data storage unit stores said template data, and
wherein said matching unit performs individual authentication of the person by comparing said authentication data generated by said authentication image acquisition device with said template data stored in said template data storage unit.

11. The individual authentication system as described in claim 10 further comprising an authentication processing drive device, a matching result transforming device, and a matching result receiving device,
wherein said authentication processing drive device requests said authentication image acquisition device to start authentication processing when prescribed conditions have been met,
wherein said matching result transforming device receives a result of matching conducted by said matching unit,
wherein said matching result transforming device is configured to generate a unique code for the person or the terminal used by the person, when the result of said matching has been satisfactory in the individual authentication, and
wherein said matching result receiving device is configured to receive said unique code generated by said matching result transforming device.

12. A method for individual authentication including the following steps:
  (1) a step of acquiring, by a camera, at least one single reflection color image formed by light which is emitted from an authentication light source which emits at least red light in the visible light region and reflected from a palm of a human body, wherein said at least one single reflection color image has RGB pixel values in RGB color space or pixel values in a color space that is convertible into or from RGB color space;
  (2) a step of extracting, by an image processing unit, a shape of a palm print and a shape of the veins in said palm, respectively, from said single reflection color image for authentication, by performing image processing of said single reflection color image to generate authentication data, wherein said image processing comprises, for extracting the shape of the veins, processing of signals in the single reflection color image, and wherein said image processing is executed in at least a three dimensional color space used for specifying the single reflection color image, which single reflection color image is also used for extracting the shape of the palm print, and thereby extracting the shape of the veins; and
  (3) a step of performing authentication by comparing said authentication data with previously-saved template data.

13. The method for individual authentication as described in claim 12,
wherein said authentication data includes a first authentication data that corresponds to said shape of the palm print and a second authentication data that corresponds to said shape of the veins, wherein said authentication includes a first authentication and a second authentication to be conducted after performing the first authentication, and wherein said first authentication is conducted using said first authentication data and said second authentication is conducted using said second authentication data.

14. The method for individual authentication as described in claim 13, wherein said authentication data includes a third authentication data created by integrating the first authentication data corresponding to said shape of the palm print with the second authentication data corresponding to said shape of the veins, and wherein said authentication is performed using said third authentication data.

15. The method for individual authentication as described in claim 12 including the following steps to be performed prior to said authentication:

(a) a step of acquiring at least one single reflection color image formed by light which is emitted from a template light source emitting at least red light in the visible light region, and is reflected from a palm of a human body;

(b) a step of extracting a shape of a palm print and shape of the veins in said palm, respectively, from said single reflection color image for a template, by performing image processing of said single reflection color image to generate template data, and (c) a step of saving said template data for succeeding authentication.

* * * * *